(12) United States Patent
Tran

(10) Patent No.: US 8,386,103 B2
(45) Date of Patent: Feb. 26, 2013

(54) ELECTRIC VEHICLE RECHARGING STATION

(75) Inventor: Bao Tran, Saratoga, CA (US)

(73) Assignee: Muse Green Investments LLC, Dover, DE (US)

( * ) Notice: Subject to any disclaimer, the term of this patent is extended or adjusted under 35 U.S.C. 154(b) by 216 days.

(21) Appl. No.: 12/728,237

(22) Filed: Mar. 21, 2010

(65) Prior Publication Data
US 2011/0015821 A1 Jan. 20, 2011

Related U.S. Application Data

(60) Provisional application No. 61/174,336, filed on Apr. 30, 2009.

(51) Int. Cl.
B60L 11/00 (2006.01)
B60L 9/00 (2006.01)
(52) U.S. Cl. ........... 701/22; 701/45; 701/49; 701/69; 320/104; 105/396; 180/65.1
(58) Field of Classification Search .......... 701/22, 701/45, 49, 69; 320/104; 105/396; 180/65.1
See application file for complete search history.

(56) References Cited

U.S. PATENT DOCUMENTS

| 4,532,418 | A | 7/1985 | Meese |
| 4,876,540 | A | 10/1989 | Berthon |
| 5,327,066 | A | 7/1994 | Smith |
| 5,460,234 | A * | 10/1995 | Matsuura et al. ........... 180/65.1 |
| 6,314,169 | B1 | 11/2001 | Schelberg, Jr. |
| 6,614,204 | B2 | 9/2003 | Pellegrino |
| 6,871,599 | B2 * | 3/2005 | Okuno et al. ............. 105/396 |
| 7,302,315 | B2 * | 11/2007 | Oesterling et al. ............. 701/1 |
| 7,948,207 | B2 * | 5/2011 | Scheucher .................. 320/104 |
| 2007/0079500 | A1 | 4/2007 | Silverman |
| 2008/0091352 | A1 | 4/2008 | O'Hare |

* cited by examiner

Primary Examiner — Luna Champagne
(74) Attorney, Agent, or Firm — Christensen O'Connor Johnson Kindness PLLC

(57) ABSTRACT

A parking meter includes an access control device to uniquely identify a vehicle based on wireless communication with the vehicle; and a plurality of power connections to distribute electricity to charge in parallel a plurality of battery sets in the vehicle. The battery sets may form an exterior body of the vehicle.

17 Claims, 5 Drawing Sheets

ELECTRIC VEHICLE RECHARGING STATION

This application claims priority to Provisional Application Ser. No. 61/174,336 filed Apr. 30, 2009, the content of which is incorporated by reference.

BACKGROUND

The present disclosure relates to rapid recharging circuits and recharging stations for electric vehicles.

Battery electric vehicles were developed more than a century ago, yet the usage of plug-in battery electric vehicles is still limited to some short distance, low speed transportation such as golf carts, commuting carts in big buildings and manufacturing facilities, and handicap vehicles. Although many different models of electric cars have been developed, none of them have achieved the market acceptance of vehicles powered by internal combustion engines.

However, recent awareness of human activity's impacts on environment pollution has propelled the need to develop green vehicle alternatives to gasoline-powered vehicles such as electric vehicles.

One issue with electric vehicles is the battery capacity/weight. Currently, most electric cars offer a range of 50-60 miles before they need to be recharged. However, most garages or parking meters do not offer power plugs to recharge these cars.

U.S. Pat. No. 4,532,418 discloses a structure for charging an electric vehicle at a parking location and facilitating billing for the charging energy utilized and the parking time. The structure includes a charging and parking meter at a parking space for receiving a charge card and into which a charging plug from an electric vehicle may be placed, structure for reading the charge card placed in the meter and for locking the plug in place, and a central processor unit for determining the charging energy used and parking time and for storing billing data relative thereto at a remote location, for periodic removal to facilitate billing. The parking meter permits charging of an electric vehicle at a parking location in response to use of a charge card and stores charging and parking information for subsequent retrieval to facilitate billing to the owner of the charge card.

SUMMARY

In one aspect, a parking meter includes an access control device to uniquely identify a vehicle based on wireless communication with the vehicle and a plurality of power connections to distribute electricity to charge in parallel a plurality of battery sets in the vehicle. The battery sets may form an exterior body of the vehicle.

In another aspect, a vehicle includes a plurality of sets of rechargeable batteries, each set having a dedicated charger for distributed recharging of the batteries, the batteries forming an outer exterior of the vehicle; and a power cable linking the composite body panels, each power cable transmitting data to and from the composite body panels.

Implementations of the vehicle may include one or more of the following. The power cable can be a coaxial cable or a power cable and a data cable. The data cable can be a fiber optic cable. The data cable can also be an Ethernet cable. The data can be an Internet Protocol (IP) in the cable. Each body panel can have a battery recharger. The body panel can be made of lithium ion batteries. The batteries can have a shape that conforms to a specific shape such as a door or a hood or a seat, for example. To protect the occupant, a beam can be used that transfers a crash load into the vehicle body and away from a passenger cabin. Additionally, driver and passenger air bags are positioned in the vehicle body. A wireless transceiver can be connected to the power cable. The wireless transceiver sends status of components in the vehicle to a remote computer. The wireless transceiver communicates maintenance information to a remote computer. If needed, the remote computer orders a repair part based on the maintenance information and schedules a visit to a repair facility to install the repair part.

Implementations of the vehicle may additionally include one or more of the following. The vehicle may include a liquid reservoir; a vehicle exterior body having a chamber to contain water and adapted to evaporate the liquid to cool the vehicle; and a pump coupled to the chamber and the liquid reservoir to circulate the liquid. The system includes a handle near a vehicle window, the handle having a fan to draw air from the vehicle interior to the outside. The vehicle window includes a motor to move the window up or down, comprising a processor coupled to the motor to move the window down to allow air circulation. The chamber can be safety glass. A clear hydrophobic material can be used in the chamber. A moveable shade can be provided under the chamber to shield UV rays. The vehicle body that is cooled can be a rooftop or windows on the car. A solar cell can be mounted above the chamber. A concentrator can be used for focusing sunlight on the solar cell. A hydrophobic material can be used in the chamber or shroud in the chamber. A vent can be used to bring evaporation into the vehicle interior to humidify the interior. A processor can control the pump to vary the pump speed to adjust the temperature of the vehicle interior. A battery chamber can be connected to the chamber to cool the battery. The chamber is positioned on a rooftop, window or trunk. A return path can connect the liquid reservoir and the chamber, wherein the return path runs through a passenger seat to cool the seat. The vehicle exterior body can be a laminate defining the chamber and piping connected to the chamber. The vehicle exterior body can be a lightweight composite material.

Advantages of a representative embodiment may include one or more of the following. The system distributes recharging energy so replenishing the battery can be done quickly and in a distributed manner. Cost is minimized since overhead charging control components are centralized in a controller. The actual energy transfer switches are distributed to minimize energy losses. The system is light weight and distributes the weight of the battery throughout the car. The battery can be air cooled since it is not densely packed into a large brick. Battery repair and replacement can be done easily, as well. The strength of the battery is available as structural support to provide safety to the occupant of the vehicle.

DESCRIPTION

Methods and apparatus that implement the embodiments of the various features of the disclosure will now be described with reference to the drawings. The drawings and the associated descriptions are provided to illustrate embodiments of the disclosure and not to limit the scope of the disclosure. Reference in the specification to "one embodiment" or "an embodiment" is intended to indicate that a particular feature, structure, or characteristic described in connection with the embodiment is included in at least an embodiment of the disclosure. The appearances of the phrase "in one embodiment" or "an embodiment" in various places in the specification are not necessarily all referring to the same embodiment. Throughout the drawings, reference numbers are re-used to indicate correspondence between referenced elements.

Figure 1:
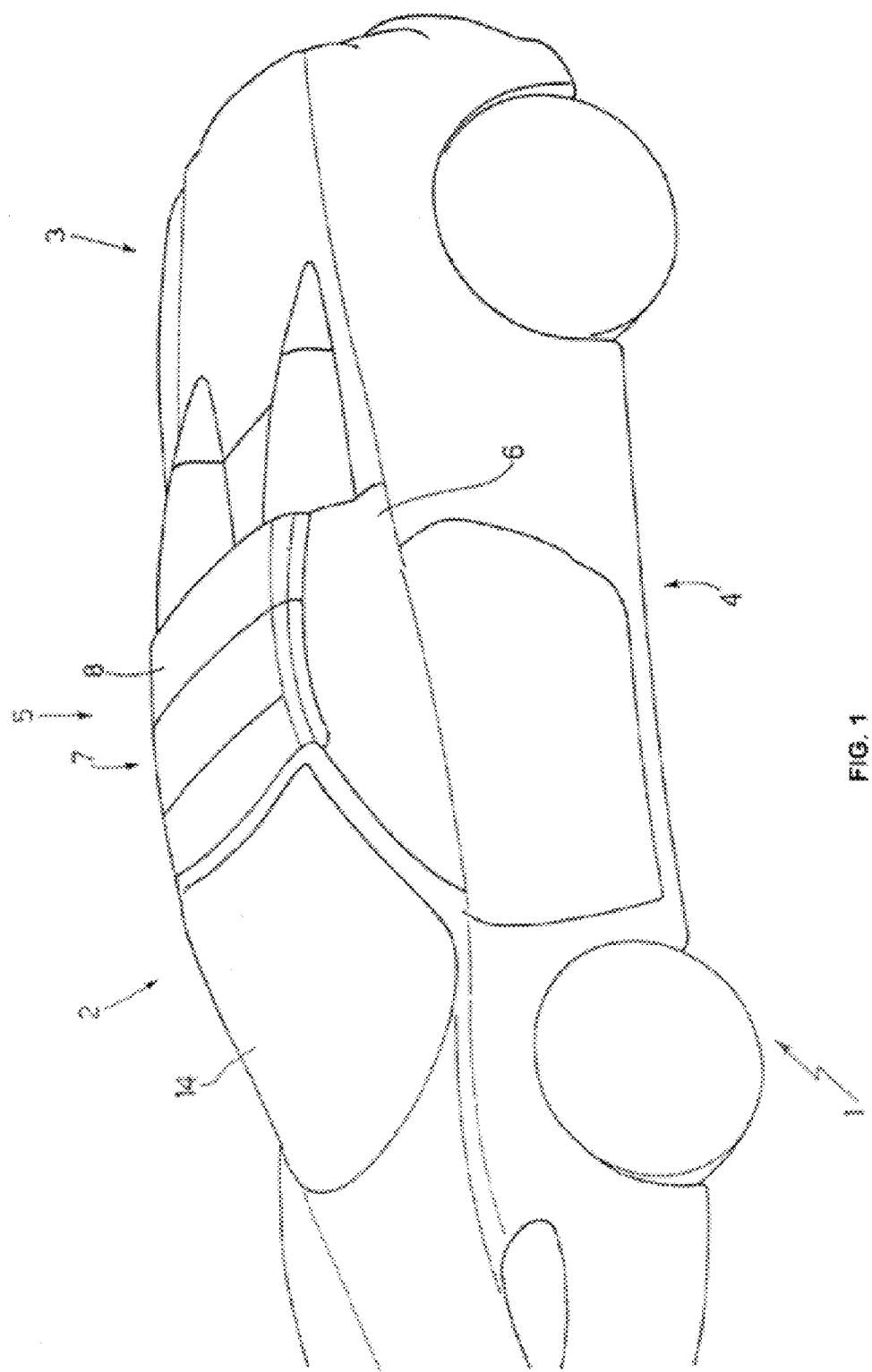
FIG. 1 shows a representative environmentally friendly vehicle.

FIG. 1 shows a representative environmentally friendly vehicle such as a car 1 with a passenger compartment 2 and a central engine compartment 3 behind passenger compartment 2 with a front window 14 and one or more side windows and a rear window. Although the engine compartment 3 is shown as a rear engine, the engine compartment 3 can also be a front engine compartment. The engine can be an all electric engine, hydrogen engine, hybrid engine, or an ultra low emission gas engine. To minimize emission, the ULEG engine can be turned off when stopped, or the cylinders can be disabled if full power is not needed.

A frame 4 of the car 1 supports a roof 5 which can be a sun roof that can expose the passenger compartment 2 in an open position and can cover the passenger when closed. To support the sun roof 5, the frame 4 provides two vertical posts 6 facing each other on opposite sides of car 1 at the boundary between passenger compartment 2 and engine compartment 3. When the sun roof 5 is in the closed position, roof members 7 and 8 are substantially horizontal, substantially coplanar, and positioned seamlessly one behind the other. The car 1 contains a cooling system that minimizes the weight and power consumption of the conventional air conditioning system for the car 1.

In one embodiment, the vehicle exterior body can be a laminate defining the chamber and piping connected to the chamber. The vehicle exterior body can be a lightweight composite material. Composite body structures provide an impact-resistant exterior that is lighter than steel but three times as strong. The car 1 can include front crash zones that absorb and deflect energy to keep the passenger from harm. The car 1 can also provide integrated high-strength aluminum door beams that transfer crash loads into the body and away from the cabin. A complement of driver and passenger air bags is incorporated to ensure that each passenger is protected and secure.

The car 1 can provide an evaporative cooling system with a fluid. The fluid can be Freon or water or any suitable evaporative fluid. Water is cheap and has no side effect. Thus, in one embodiment, the system reduces the temperature of a space by making use of the natural characteristic of water to absorb heat during its vaporization from the body with which it is in contact.

In one embodiment, evaporation can be enhanced by creating small rough surfaces on the floor of a container. Such rough surfaces can be made by blasting, sanding, or depositing small projective surfaces on the floor. The vapor eventually condenses and is subsequently collected by the liquid reservoir. A pump can circulate water needed for the vaporization according to the specific conditions of each case so that it can be kept wet on its whole surface. A wet surface such as a shroud or fabric reduces the temperature of a space by making use of the natural characteristic of water to absorb heat during its vaporization from the body with which it is in contact. It includes large wet surfaces created with a small mass of water within a limited space due to the activation of the molecular powers of water and of other material with molecular powers relevant to the ones of water.

Figure 2:
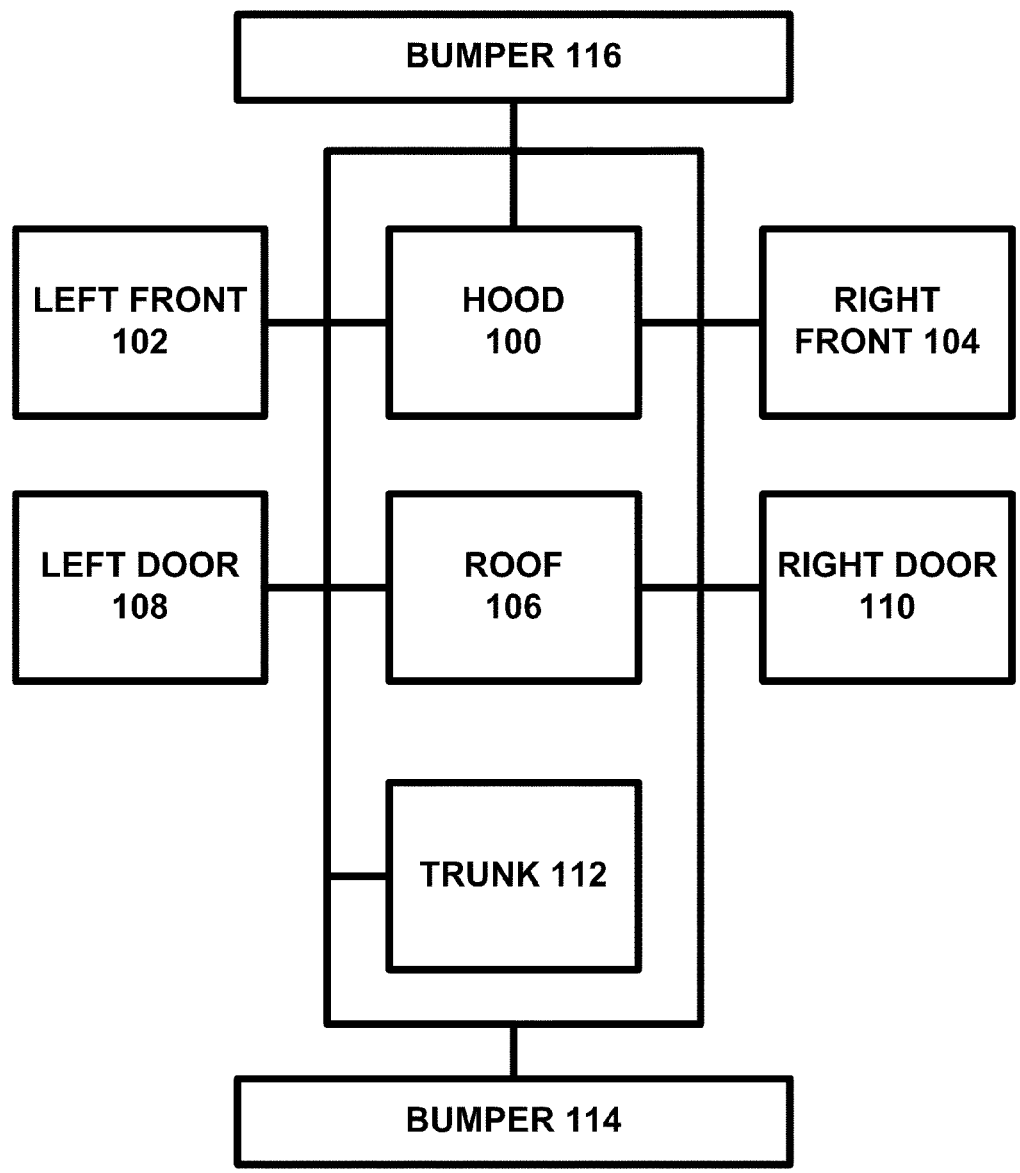
FIG. 2 illustrates a representative battery system and a representative power cable system for a car.

FIG. 2 illustrates a representative battery and power cable system for a car 1. In FIG. 2, each car body part contains a battery shaped to provide a particular mechanical function. The battery can be a rechargeable battery such as a lithium type battery, among others. For example, a battery shaped as hood 100 covers the engine and can be opened to allow access to the engine and other drive train components. Battery-shaped left and right front portions 102, 104 cover the left and right front part of the car, while a battery shaped as a front bumper 116 provides protection against frontal collision. A battery shaped as a left door 108 and as a right door 110 allows passenger access to the vehicle, while a battery shaped as a roof 106 protects the occupant from sun or rain. A battery shaped as a trunk 112 covers a storage space, and a battery shaped as a rear bumper 114 protects the vehicle from a rear collision.

The battery can be rechargeable lithium ion, although other chemistries can be used. In one embodiment, conformal batteries such as lithium polymer batteries can be formed to fit the available space of the car body part regardless of the geometry of the part. Alternatively, for batteries that are available only in relatively standard prismatic shapes, the prismatic battery can be efficiently constructed to fill the space available, be it rectilinear or irregular (polyhedral) in shape. This conformal space-filling shape applies in all three dimensions. In one embodiment, this is done by selecting a slab of lithium polymer battery material of a desired height; freezing the slab; vertically cutting the slab to a desired shape thus forming a cut edge; attaching an anode lead to each anode conductor of the cut slab along the cut edge while maintaining the cut slab frozen; and attaching a cathode lead to each cathode conductor of the cut slab along the cut edge while maintaining the cut slab frozen. The slab may contain one or many cells. The leads may be made of single or multi-stranded, metallic wire, metallic ribbon, low melting point alloy, self-healing metal, and litz wire. Attachment is accomplished so as to minimize tension on the leads. The cut slab may need to be deburred after cutting and before attaching leads. The cut edge may be inspected for burrs before deburring is performed. As discussed in US Application Serial No. 20070079500, the content of which is incorporated by reference, burr formation can be avoided by recessing the edge of each anodic half cell or each cathodic half cell by mechanical means, blowing away dust, and insulating the recessed edges with non-conductive polymer. Lead attachment may be accomplished by a number of methods including: wire bonding; wedge bonding; adhering the lead to the electrode with conductive epoxy, anistotropic conductive adhesive or conductive thermoplastic; stapling with microstaples; adhering the lead to the electrode by electro polymerization; welding the lead to the electrode with micro welding; and growing a lead in place by electro less plating, electroplating or a combination of electroless plating and electroplating. The leads should be insulated. The insulation can be thermoplastic. If there is more than one cell in the slab, the distal ends of the leads may be connected together so that the cells are connected together in series, in parallel or some in series and the remainder in parallel. After the leads have been attached to the cut slab and connected together, the assembly can be wrapped with standard packaging for lithium polymer batteries or a shrinkable form-fitting version thereof.

Because the starting material for the conformal battery is purchased pre-made from a battery manufacturer, this approach eliminates the considerable expense of formulating and producing the materials for the anodes and cathodes as well as combining the anodes and cathodes into battery cells. This reduces cost and weight for the car.

Figure 4:
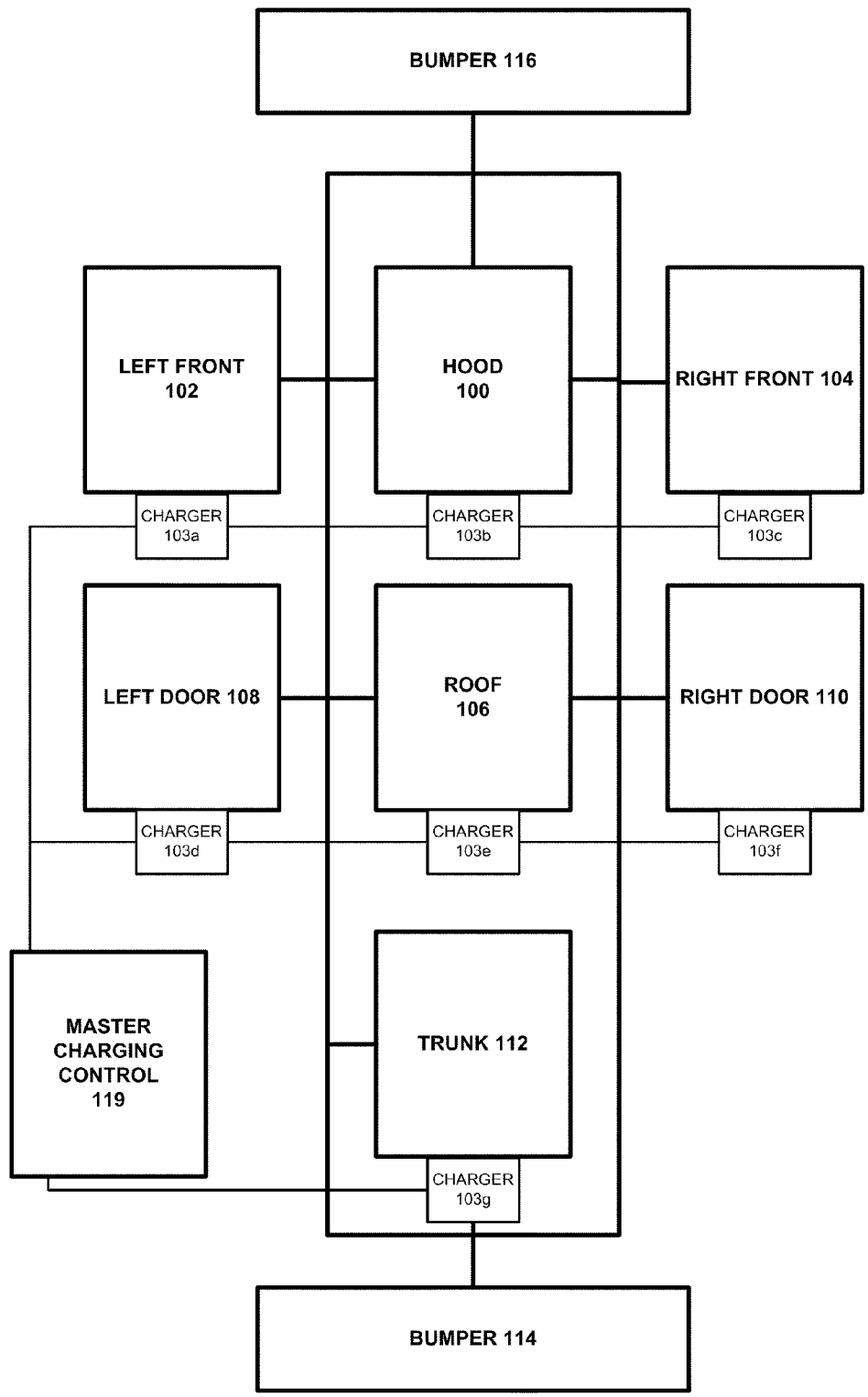
FIG. 4 illustrates a representative battery system and a representative power cable system for a car.

In one embodiment shown in FIG. 4, each of batteries 100-116 has a built-in charger 103a-103g and a switch to isolate each battery 100-116 to enable rapid parallel charging from one power cable. During such parallel charging, each battery 110-116 is charged independent of the others. A master charging controller 119 controls and coordinates the chargers 103a-103g to ensure quick charging. Battery-monitoring systems can monitor the battery's state of charge, which in turn determines the battery's cost and performance. By knowing the battery's state of charge, the system can use more capacity from each cell, use fewer cells, and maximize the lifetimes of those cells. Voltage, current, charge, and temperature can provide a good indication of the state of charge. The charging/discharging of series-connected cells must stop when any cell reaches its maximum or minimum allowable state of charge. The system keeps the capacity levels the same in all cells over time and helps them age in unison. The battery-monitoring system can tweak the charge level in each cell to derive more energy and greater lifetime from the pack. Cell balancing is a critical feature in EVs and HEVs.

In one embodiment, a passive-balancing technique places a bleed resistor across a cell when its state of charge exceeds that of its neighbors. Passive balancing doesn't increase the drive distance after a charge because the technique dissipates, rather than redistributes, power. In another embodiment, active balancing is used so that the charge shuttles between cells and does not end up as wasted heat. This approach requires a storage element such as capacitors, inductors, or transformers for the charge transfer. The capacitor continuously switches between two adjacent cells. Current flows to equalize the voltage and, therefore, the state of charge of the two cells. Using a bank of switches and capacitors, the voltage of all cells tends to equalize. The circuit continuously balances cells in the background as long as the switching clock is active. A transformer-based scheme transfers charge between a single cell and a group of cells. The scheme requires state-of-charge information to select the cell for charging and discharging to and from the group of six cells.

Figure 3:
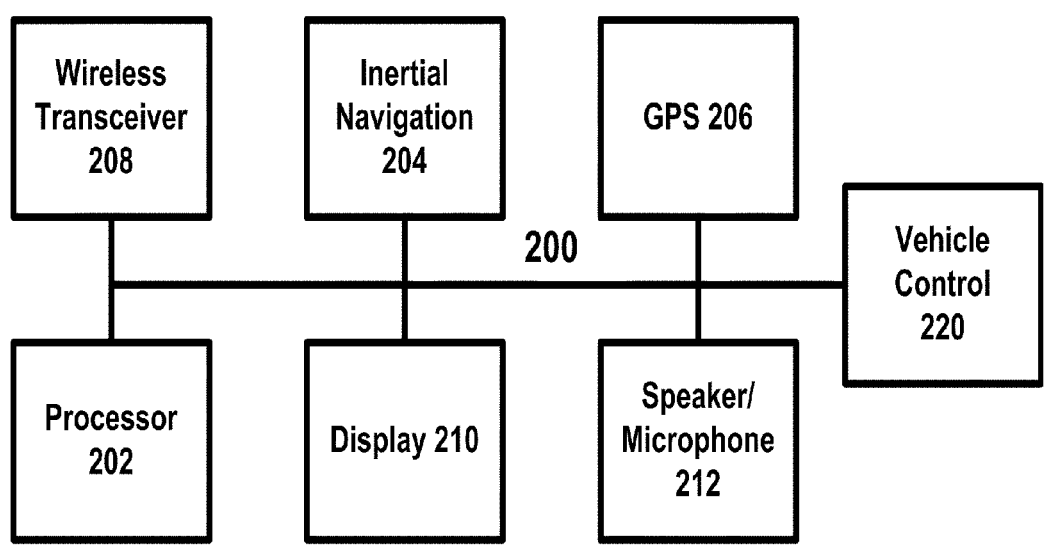
FIG. 3 shows a representative car electronic system.

FIG. 3 shows a block diagram of an embodiment of an electrical power and automobile control system. The system is controlled by a processor 202. The processor 202 is connected with an inertial navigation system (INS) 204 and a global positioning system (GPS) receiver 206 that generate navigation information. The processor 202 is also connected with a wireless communication device 208 that transmits and receives digital data as well as being a Doppler radar when desired. The processor 202 drives a display 210 and a speaker 212 for alerting a driver. The processor 202 provides control inputs to the automobile's braking and steering systems 220. A power cable 200 carries power between the batteries 100-116 and an electric motor engine (not shown). The power cable 200 also carries power to recharge the batteries 100-116 serially or in parallel, as discussed above.

The power cable 200 can be a coaxial cable or a power cable and a data cable. In one embodiment, the same wire carrying power also carries data. Data in the form of radio frequency (RF) energy can be bundled on the same line that carries electrical current. Since RF and electricity vibrate on different frequencies, there is no interference between the two. As such, data packets transmitted over RF frequencies are not overwhelmed or lost because of electrical current. Eventually, the data can be provided to wireless transmitters that will wirelessly receive the signal and send the data on to computer stations. Representative protocols that can be used include CAN-bus, LIN-bus over power line (DC-LIN), and LonWorks power line-based control. In one embodiment, the protocol is compatible with the HomePlug specifications for home networking technology that connects devices to each other through the power lines in a home. Many devices have HomePlug built in, and to connect them to a network, all one has to do is to plug the device into the wall in a home with other HomePlug devices. In this way, when the vehicle is recharged by plugging the home power line to the vehicle connectors, automotive data is automatically synchronized with a computer in the home or office.

Alternatively, two separate transmission media can be used: one to carry power and a second to carry data. In one embodiment, the data cable can be a fiber optic cable, while the power cable can be copper cable or even copper coated with silver or gold. The data cable can also be an Ethernet cable. The data can be an Internet Protocol (IP) in the cable. Each body panel can have a battery recharger. The body panel can be made of lithium ion batteries. The batteries can have a shape that conforms to a specific shape such as a door or a hood or a seat, for example. To protect the occupant, a beam can be used that transfers a crash load into the vehicle body and away from a passenger cabin. Additionally, driver and passenger air bags are positioned in the vehicle body. A wireless transceiver can be connected to the power cable. The wireless transceiver sends status of components in the vehicle to a remote computer. The wireless transceiver communicates maintenance information to a remote computer. If needed, the remote computer orders a repair part based on the maintenance information and schedules a visit to a repair facility to install the repair part.

This embodiment includes navigation systems, the INS 204 and the GPS receiver 206. Alternate embodiments may feature an integrated GPS and INS navigation system or other navigation system. The use of only an INS 204 or only a GPS receiver 206 as the sole source of navigation information is also contemplated. Alternatively, the wireless communication device 208 can triangulate with two other fixed wireless devices to generate navigation information.

A display 210 and speaker/microphone 212 provide both visual and audio situational awareness information to a driver. Alternate embodiments may feature only a display 210 or only a speaker 212 as the sole source of information for the driver. Embodiments that interact directly with the braking and steering systems that provide no audio information to the driver are also contemplated.

The INS 204 supplies the processor 202 with navigation information derived from accelerometers and angular position or angular rate sensors. The processor 202 may also provide the INS 204 with initial position data or periodic position updates that allow the INS 204 to correct drift errors, misalignment errors or other errors.

The INS 204 may be a standard gimbal or strapdown INS having one or more gyroscopes and substantially orthogonally mounted accelerometers. Alternatively, the INS 204 may have accelerometers and microelectromechanical systems (MEMS) that estimate angular position or angular rates. An INS 204 having a gyroscope for detecting automobile heading and a speed sensor is also contemplated.

The GPS receiver 206 supplies the processor 202 with navigation information derived from timing signal received from the GPS satellite constellation. The processor 202 may provide the GPS receiver 206 with position data to allow the GPS receiver 206 to quickly reacquire the timing signals if the timing signals are temporarily unavailable. The GPS timing signal may be unavailable for a variety of reasons, for example, antenna shadowing as a result of driving through a tunnel or an indoor parking garage. The GPS receiver 206 may also have a radio receiver for receiving differential corrections that make the GPS navigation information even more accurate.

The INS 204 and the GPS receiver 206 are complementary navigation systems. The INS 204 is very responsive to changes in the trajectory of the automobile. A steering or braking input is sensed very quickly at the accelerometers and the angular position sensors. INS 204 position and velocity estimates, however, are derived by integrating accelerometer measurements and errors in the estimates accumulate over time. The GPS receiver 206 is not generally as responsive to changes in automobile trajectory but continually estimates position very accurately. The use of both the INS 204 and the GPS receiver 206 allows the processor 202 to estimate the automobile's state more accurately than with a single navigation system.

The wireless communication device 208 receives the automobile's navigated state vector from the processor 202. The wireless communication device 208 broadcasts this state vector for use by neighboring automobiles. The wireless communication device 208 also receives the state vectors from neighboring automobiles. The received state vectors from the neighboring automobiles are sent to the processor 202 for further processing. The automobile state vector may have more or less elements describing the state of the vehicle such as the XYZ position and 3D velocity of the vehicle and 3D acceleration. Other information may be provided. For example the state vector may contain entries that describe the angular position, the angular rates, and the angular accelerations. The state vector may be described using any coordinate system or any type of units. The state vector may also contain information about the vehicle such as its weight, stopping distance, size, fuel state, etc. Information packed in the state vector may be of value in collision avoidance trajectory analysis or may be useful for generating and displaying more accurate display symbology for the driver. For example, the automobile may receive a state vector from a neighboring vehicle that identifies the vehicle as an eighteen wheel truck with a ten ton load. Such information may be important for trajectory analysis and for providing accurate and informative display symbology.

The wireless communication device 208 may be part of a local area wireless network such as an IEEE 802.11 network. The local area network may be a mesh network, ad-hoc network, contention access network, or any other type of network. The use of a device that is mesh network-enabled according to a widely accepted standard such as 802.11(s) may be a good choice for a wireless communication device 208. The wireless communication device 208 may also feature a transmitter with low broadcast power to allow automobiles in the area to receive the broadcast signal. The broadcast of state vectors over a broad area network or the internet is also contemplated.

The display 210 and the speaker 212 are features that provide the driver with situational awareness. The processor 202 sends commands to the display 210 and the speaker 212 that alert the driver to hazards. The display 210 may, for example, show the relative positions and velocities of neighboring vehicles. The display 210 may also warn the driver to slow down or apply the brakes immediately. The speaker 212 may give aural warnings such as "STOP" or "CAUTION VEHICLE APPROACHING".

The braking and steering systems 220 may also be commanded by the processor 202. The processor 202 may command that the brakes be applied to prevent collision with a vehicle ahead or may provide a steering input to prevent the driver from colliding with a vehicle. The processor 202 may also issue braking or steering commands to minimize the damage resulting from a collision as discussed in United States Patent Application No. 20080091352, the content of which is incorporated by reference.

Figure 5:
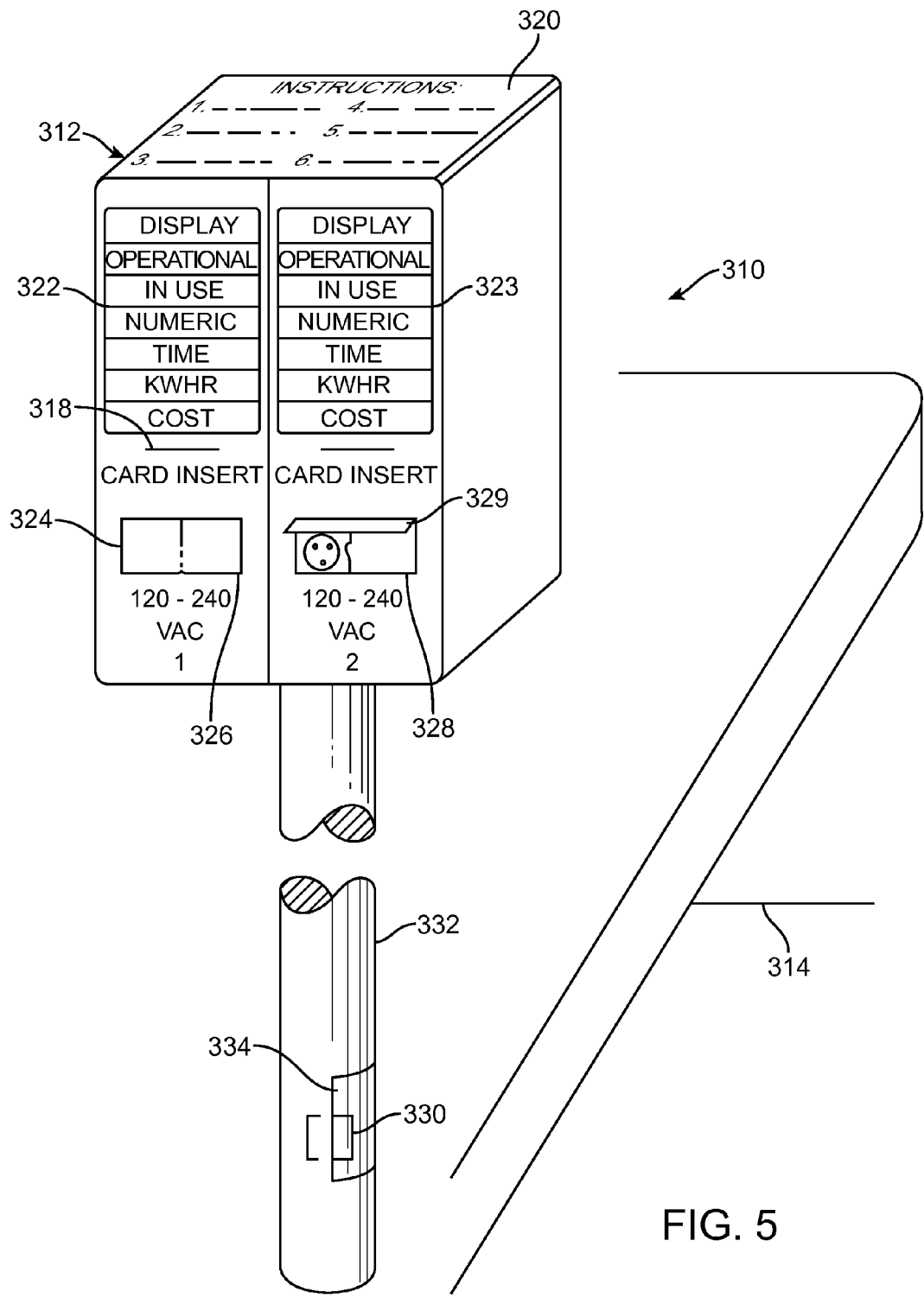
FIG. 5 shows a representative parking meter with distributed recharging capability.

FIG. 5 shows a representative parking meter with distributed recharging capability. In one embodiment, the electric vehicle charging and parking meter system structure 310 includes a meter 312 positioned adjacent a parking space 314 and a microprocessor (not shown) connected to the meter 312 for computing and storing time, electrical energy use, and cost data for vehicles parked in the parking space 314. The microprocessor stores time, kilowatt hour, and cost data for transmission to a central billing computer to determine and collect fees from the car owner who used the meter 312.

In use, a series of charging and parking meters 312 are placed at a location along a street or a parking facility and supply alternating current, as, for example, 120 or 240 volt A.C., thereto. In one embodiment, the electric vehicles have distributed chargers, one for each group of batteries, for converting the alternating current energy available at the meter 312 to direct current and for controlling the state of charge of the vehicle batteries. The distributed chargers enable each group of batteries to be charged separately, thus avoiding the bottleneck of one set of batteries slowing down the charging of another set. Also, power can be provided in parallel rather then sequentially.

A wireless control device in the car can transmit financial information to the meter 312 to enable power to be provided to the charging cord plug to the meter 312. In one embodiment, the wireless control device can be a cell phone communicating with the meter 312 using Bluetooth, ZigBee (802.15) or WiFi (802.11). Alternatively, to facilitate use by one-time users who do not have an account, the charging can be facilitated by inserting a charge card into the meter 312 through slot 318 and connecting the electric vehicle's charging cord plug to the meter 312.

A plurality of voltage sources, for example, 120 and 240 volt A.C. outlets 324 and 326, respectively, can be provided at the meter 312. The voltage sources 324 and 326 are provided with a sliding cover 328 so that only one will be available at anyone time and are further provided with a separate spring-loaded cover 329 to protect the voltage sources when not in use. A ground fault interrupter breaker 330 is provided in the meter post 332 with access through the post door 334.

The meter 312 includes a display 322 or 323 to provide user feedback. The display 322 or 323 can be a touch screen display to capture user input as well. In another embodiment, the displays 322, 323 can be the separate operational display structure 322 and numeric display structure 323 and also include the plug lock mechanism 338 and card reader 340. The plug lock mechanism 338 is operable on an instruction from the wireless transceiver on the vehicle or on the first insertion of a charge card to lock a vehicle's electric charging cord plug to the meter 312 and to release the plug from the meter 312 on the second insertion of a charge card in the meter structure 310. The card reader 340 functions to identify the presence of a card in the meter 312 and to validate the card in accordance with identification parameters on the card.

The electric vehicle charging and parking meter system structure 310 includes an overload detector for sensing charging circuit overloads, an open circuit detector for sensing an open charging circuit, a kilowatt transducer for determining energy used in charging of the electric vehicle, and a time clock for aiding in the determination of the energy used in charging the vehicle and in determination of the time of parking the vehicle. A power breaker is provided for connecting and disconnecting the power to the electric vehicle being charged. The breaker is activated or deactivated by customer request or a system fault.

A series of charging and parking meters 312 can be connected to a single microprocessor unit, which unit could be contained in one of the charging and parking meter enclosures to serve more than one charging and parking meter, or could be located in a nearby protected area to serve a group of charging and parking meters.

The charging and parking meters 312 may be made to service one, two, or more electric automobiles. The charging and parking meters would function as a means of charging electric batteries when the owners are away from their residence. It is therefore hypothesized that the charging and parking meters would be located at shopping centers, indoor and outdoor theaters, parking garages, on-street and off-street parking spaces, or any other location where an electric vehicle owner may park for an extended time. Thus, the range of an electric vehicle can be extended considerably.

It should be understood, of course, that the foregoing relates to representative embodiments of the disclosure and that modifications may be made without departing from the spirit and scope of the claimed subject matter.

What is claimed is:

1. A vehicle comprising:
   a plurality of sets of rechargeable batteries, wherein each set has a dedicated charger for distributed recharging of the batteries, and wherein the batteries form a shape of an exterior of the vehicle through composite body panels; and
   a power cable linking the composite body panels, wherein the power cable is configured to transmit data to and from the composite body panels.

2. The vehicle of claim 1, wherein the power cable comprises a coaxial cable.

3. The vehicle of claim 1, wherein the power cable comprises a power cable and a data cable.

4. The vehicle of claim 3, wherein the data cable comprises a fiber optic cable.

5. The vehicle of claim 3, wherein the data cable comprises an Ethernet cable.

6. The vehicle of claim 1, wherein each composite body panel comprises a battery recharger.

7. The vehicle of claim 1, wherein the composite body panels comprise a plurality of lithium ion batteries.

8. The vehicle of claim 1, further comprising a beam configured to transfer a crash load into the vehicle body and away from a passenger cabin.

9. The vehicle of claim 1, further comprising a wireless transceiver coupled to the power cable.

10. The vehicle of claim 9, wherein the wireless transceiver is configured to transmit status of components in the vehicle to a remote computer.

11. The vehicle of claim 9, wherein the wireless transceiver is configured to communicate maintenance information to a remote computer.

12. The vehicle of claim 11, wherein the remote computer is configured to order a repair part based on the maintenance information and schedule a visit to a repair facility to install the repair part.

13. The vehicle of claim 1, further comprising a power line network device coupled to the power cable, the power line network device configured to communicate vehicular information over a power line network to a remote computer.

14. The vehicle of claim 13, wherein the power line network is configured to communicate with USB protocol or Firewire protocol.

15. The vehicle of claim 1, wherein each set of rechargeable batteries is electrically isolated during charging and electrically connected thereafter.

16. A vehicle comprising:
   a plurality of sets of rechargeable conformal batteries, wherein each set has a dedicated charger for distributed recharging of the conformal batteries, and wherein the conformal batteries form a shape of an exterior of the vehicle through composite body panels; and
   a power cable linking the composite body panels.

17. The vehicle of claim 16, wherein the rechargeable conformal batteries comprise lithium polymer batteries.

* * * * *

UNITED STATES PATENT AND TRADEMARK OFFICE
CERTIFICATE OF CORRECTION

PATENT NO. : 8,386,103 B2
APPLICATION NO. : 12/728237
DATED : February 26, 2013
INVENTOR(S) : Tran It is certified that error appears in the above-identified patent and that said Letters Patent is hereby corrected as shown below:

In the Specification

In Column 2, Line 64, delete "DESCRIPTION" and insert -- DETAILED DESCRIPTION --, therefor.

In Column 3, Line 19, delete "be an all" and insert -- be an --, therefor.

In Column 4, Line 50, delete "anistotropic" and insert -- anisotropic --, therefor.

In Column 8, Line 27, delete "then" and insert -- than --, therefor.

In Column 8, Line 42, delete "anyone" and insert -- any one --, therefor.

Signed and Sealed this
Eleventh Day of March, 2014

Michelle K. Lee
*Deputy Director of the United States Patent and Trademark Office*